(12) United States Patent
Bossut et al.

(10) Patent No.: US 10,467,812 B2
(45) Date of Patent: Nov. 5, 2019

(54) MANAGING THE DISPLAY OF ASSETS IN AUGMENTED REALITY MODE

(71) Applicant: ARTAG SARL, Luxembourg (LU)

(72) Inventors: Christophe Bossut, Vernon (FR); Guillaume Pineau-Valencienne, Paris (FR); Guy Le Henaff, Montreal (CA); Yves Chapelain De La Villeguerin, Lisbon (PT)

(73) Assignee: ARTAG SARL, Luxembourg (LU)

( * ) Notice: Subject to any disclaimer, the term of this patent is extended or adjusted under 35 U.S.C. 154(b) by 211 days.

(21) Appl. No.: 15/583,495

(22) Filed: May 1, 2017

(65) Prior Publication Data
US 2017/0316614 A1 Nov. 2, 2017

Related U.S. Application Data

(60) Provisional application No. 62/330,631, filed on May 2, 2016.

(51) Int. Cl.
*G06T 15/04* (2011.01)
*G06T 19/00* (2011.01)
*G06K 9/00* (2006.01)
*G06F 16/954* (2019.01)

(52) U.S. Cl.
CPC .......... *G06T 19/006* (2013.01); *G06F 16/954* (2019.01); *G06K 9/00671* (2013.01)

(58) Field of Classification Search
CPC ... G06F 16/954; G06T 19/006; G06T 11/001; G06T 15/04; G06K 9/00671; G06K 9/00771
See application file for complete search history.

(56) References Cited

U.S. PATENT DOCUMENTS 6,373,961 B1 * 4/2002 Richardson ............ G06F 3/013
 345/8
6,434,278 B1 * 8/2002 Hashimoto ............ G06T 17/00
 345/583

(Continued)

OTHER PUBLICATIONS

European Search Report issued in European Application No. 17168374.1 dated Aug. 3, 2017 (6 pages).

*Primary Examiner* — Martin Mushambo
(74) *Attorney, Agent, or Firm* — Hamre, Schumann, Mueller & Larson, P.C.

(57) ABSTRACT

The present document describes a system and method for managing the display of assets associated with images captured during an AR experience to avoid congesting the display device of the portable device used for the AR experience. The method comprising capturing images of an object; receiving a plurality of assets associated with the object being captured from a remote server; detecting the POV from which the images were taken; selecting, from the plurality of assets, a first subset of assets associated with the POV; and displaying on the display device one or more assets pertaining to the first subset only. When the user changes the position from which the object is being captured, the device detects a second POV for the images captured and displays a second subset of assets different than the first subset. Whereby, existing assets disappear and new assets appear as the user changes positions or moves the device over the object being captured.

24 Claims, 10 Drawing Sheets

(56) References Cited

U.S. PATENT DOCUMENTS

| | | | | |
|---|---|---|---|---|
| 8,443,279 B1* | 5/2013 | Hameed | ............ | A61B 1/00041 |
| | | | | 715/230 |
| 9,911,165 B2* | 3/2018 | Firminger | ............ | G06F 19/328 |
| 2006/0038833 A1* | 2/2006 | Mallinson | ............ | A63F 13/02 |
| | | | | 345/633 |
| 2009/0052729 A1* | 2/2009 | Bae | ............ | H04N 1/0044 |
| | | | | 382/100 |
| 2011/0029918 A1* | 2/2011 | Yoo | ............ | G06F 3/013 |
| | | | | 715/800 |
| 2011/0225069 A1* | 9/2011 | Cramer | ............ | G06Q 30/06 |
| | | | | 705/27.1 |
| 2012/0075285 A1* | 3/2012 | Oyagi | ............ | G06T 19/006 |
| | | | | 345/419 |
| 2013/0002846 A1* | 1/2013 | De Bruijn | ............ | A61B 3/113 |
| | | | | 348/78 |
| 2013/0154913 A1* | 6/2013 | Genc | ............ | G06F 3/012 |
| | | | | 345/156 |
| 2014/0168056 A1* | 6/2014 | Swaminathan | ............ | G06K 9/00604 |
| | | | | 345/156 |
| 2014/0184550 A1* | 7/2014 | Hennessey | ............ | G06F 3/013 |
| | | | | 345/173 |
| 2014/0368442 A1* | 12/2014 | Vahtola | ............ | G06F 3/013 |
| | | | | 345/173 |
| 2014/0375683 A1* | 12/2014 | Salter | ............ | G06F 3/013 |
| | | | | 345/633 |
| 2015/0062161 A1* | 3/2015 | Kim | ............ | G06T 19/006 |
| | | | | 345/633 |
| 2015/0062162 A1* | 3/2015 | Kim | ............ | G06T 19/006 |
| | | | | 345/633 |
| 2015/0130838 A1* | 5/2015 | Kasahara | ............ | G06K 9/00671 |
| | | | | 345/633 |
| 2015/0234456 A1* | 8/2015 | Cho | ............ | G06F 3/011 |
| | | | | 345/156 |
| 2015/0234461 A1* | 8/2015 | Suzuki | ............ | G06F 3/013 |
| | | | | 345/156 |
| 2015/0254511 A1* | 9/2015 | Yamane | ............ | G06T 11/00 |
| | | | | 345/633 |
| 2015/0265922 A1* | 9/2015 | Yamane | ............ | A63F 13/525 |
| | | | | 463/31 |
| 2015/0302623 A1* | 10/2015 | Ishikawa | ............ | G06K 9/2063 |
| | | | | 345/629 |
| 2015/0310617 A1* | 10/2015 | Hara | ............ | H04N 5/23229 |
| | | | | 345/633 |
| 2015/0363971 A1* | 12/2015 | Pan | ............ | G06T 17/00 |
| | | | | 345/420 |
| 2016/0055624 A1* | 2/2016 | Ohno | ............ | G09G 5/003 |
| | | | | 345/589 |
| 2016/0086338 A1* | 3/2016 | Nagamatsu | ............ | G06T 7/80 |
| | | | | 348/78 |
| 2016/0133051 A1* | 5/2016 | Aonuma | ............ | G06T 19/006 |
| | | | | 345/633 |
| 2016/0147408 A1* | 5/2016 | Bevis | ............ | G06F 3/04815 |
| | | | | 715/850 |
| 2016/0171773 A1* | 6/2016 | Hara | ............ | G06T 19/006 |
| | | | | 345/633 |
| 2016/0227107 A1* | 8/2016 | Beaumont | ............ | H04N 5/23222 |
| 2016/0267336 A1* | 9/2016 | Niem | ............ | G06T 7/80 |
| 2016/0282619 A1* | 9/2016 | Oto | ............ | G02B 27/017 |
| 2016/0283455 A1* | 9/2016 | Mardanbegi | ............ | G06F 17/241 |
| 2016/0314562 A1* | 10/2016 | Sakamoto | ............ | G06F 1/163 |
| 2016/0342205 A1* | 11/2016 | Shigeta | ............ | A61B 3/113 |
| 2016/0350977 A1* | 12/2016 | Doronichev | ............ | H04W 4/21 |
| 2017/0344111 A1* | 11/2017 | Kim | ............ | G06F 3/013 |
| 2018/0054611 A1* | 2/2018 | Shin | ............ | G06F 1/163 |

* cited by examiner

FIG.1

PRIOR ART

MANAGING THE DISPLAY OF ASSETS IN AUGMENTED REALITY MODE

BACKGROUND (a) Field

The subject matter disclosed generally relates to the field of Augmented Reality (AR). More particularly, the embodiments relate to a method and system for managing the display of assets in augmented reality mode.

(b) Related Prior Art

The basic principle of AR, used for example on a smartphone is the setting of additional information, called assets, atop a view of an object; a still image, a view of a document, or a video stream, as they can input from the camera (aka imaging device) of a portable device such as a smartphone, tablet etc. The assets are specific to a reference image and once this image is recognized in the picture or in the video stream or a portion thereof then position in the display port is determined which allow to display the assets in places decided at an earlier time. Assets are graphical objects that display but which may also allow interaction (like pushing a "button" like Asset which allows to call a browser with a specific URL). The fundamental action of display of assets is triggered once the camera feed is analyzed and returns a positive identification (recognition) of an object or portion of the scene. This portion should have been previously stored and registered in a digital form on an image data base, preferably in the form of a digest, as a set of features, that allows for a safe and fast retrieval. Typical technology used for this use GIST or SIFT (Scale Invariant Feature Transform) descriptor for the format of the features. Storage of Features set being in an organized structure of data that allow a classification method to be used to retrieve a decent coincidence or features without requiring an exact match. A non-limiting example of such storage and retrieve method includes LSH (locally sensitive Hashing) or KNN (K nearest Neighbor) ready multidimensional classifier. This kind of storage allows for analysis of coincidence in space to find whether or not a minimal subset exists matching the candidate image. The sample set of features submitted to the retrieve method may be a descriptor computed essentially in the same way but on a sample picture coming from the input of the smartphone.

These asset objects are associated with a view called the reference image (aka "marker" in the AR terminology). The wording "Marker" mostly designates a single image that must be recognized and which is supplied at registration time for the training of the process (computation and re-arrangement of the tree that stores the image descriptors). The apparatus can use more than one view of the same object (multiplicity of "Marker") without any conceptual or technical differences other than the need to associate the same Asset set to the multiplicity of "Marker" with their associated reference images. For sake of clarity, however, the described embodiment focus on cases where there is only one reference image "Marker" for an object. However an object may have more than one reference image (Marker) view taken under different angles.

These assets augment the visible information viewed through the camera feed by adding visible objects (aka "marker") which do not in fact exist on the object being captured by the camera. An Asset can even be a transparent image simply used as a delimiter of an area where action can be done by a touch of the touch sensitive display to trigger some action like browsing a web site, etc. In this later case the user will be under the impression that its fingers just hit a subpart of the object displayed in the viewport. Such experiences are useful for example to allow the user to designate a specific article or column in a newspaper.

Figure 1:
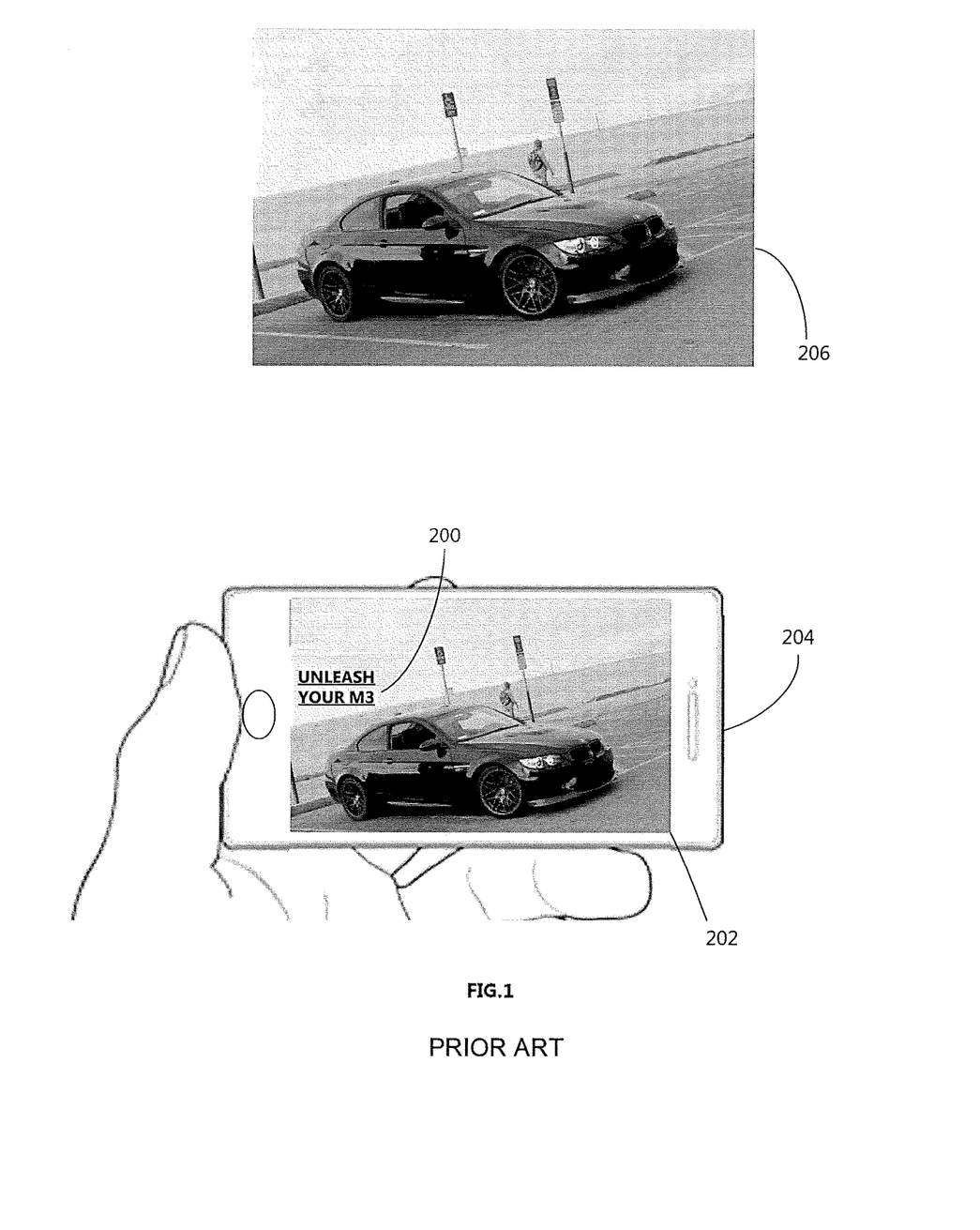
FIG. 1 illustrates an example of an asset appearing on the display of a portable device atop an object being captured in AR mode

FIG. 1 illustrates an example of an asset 200 appearing on the display 202 of a portable device 204 atop an object 206 being captured in AR mode. As shown in FIG. 1, the asset 200 exists only on the display 202 but does not in fact exist on the actual object (magazine cover) 206 being captured. Assets may have various graphical forms. Examples of assets include: image, text, icon, a 3d display sound or video etc. In a non-limiting example of implementation, the asset 200 in FIG. 1 is a URL link provided in the form of text which when touched by the user gives access to a webpage that specializes in tuning BMW® cars for increasing performance.

Some assets are common to more than one object and would therefore appear on the video feed of many objects once identified. However, other assets are specific to a given object, and would only appear atop the camera feed showing that specific object. For example, the asset 200 in FIG. 1 may be specific to the cover page 206 and may also be a common asset that may appear on other pages e.g. pages showing BMW cars.

The problem with AR is that some objects have numerous assets which makes it impossible to display them all in the display area at the same time. For example, a piece of news on the cover of a certain magazine may have different opinions and replies by different political parties, and it would not be possible to display all these replies while keeping the main page visible. Additionally, some assets are required to be displayed at specific positions on the display following movement of the object seen trough to look like they are following a specific position anchored on the marker during the AR experience. This is done by using a tracking process during the experience. However same sub content of an image may have many relevant details that are each worth having a specific Asset for, such as an arrow to obtain technical details about the rim of a side picture of a car. It can also be a price list of the car. It is then advantageous to set Asset positions relevant to the content. This is the goal of having AR Asset augmenting the view. But if the image belongs to a catalog, the display capabilities is typically limited to only one asset at each place of interest (like the rim or even the car), which reduces drastically the capabilities to explicit some options, or, alternatively, if many Assets deal with the same details it will quickly overcrowd the screen with too many information at once. The method used to avoid this effect is to segment the Marker in order to decrease the amount of Assets to display, as it can be understood from FIG. 3a and FIG. 3b, but it can also immediately appear that this de-facto removes some key information or context from the view which can be annoying from the artistic point of view.

Therefore there is a need for an improved system and method for managing the display of assets in AR mode. More particularly, there is a need for a system which allows for a rather easy selection of Assets when the assets are numerous and tend to overcrowd the view during the AR experience.

SUMMARY

According to an aspect, there is provided a method for managing a display of assets associated with images captured in an augmented reality mode on a portable device, the method comprising: using an imaging device associated with the portable device, capturing a first image of an object; receiving a plurality of assets associated with the object; detecting a first POV associated with the first image, the first POV representing a point of view from which the first image is taken using the portable device; selecting, from the plurality of assets, a first subset of assets associated with the first POV; displaying one or more assets pertaining to the first subset on a display device associated with the portable device.

In another aspect, there is provided a method for managing a display of assets associated with images captured in an augmented reality mode on a portable device, the method comprising: using an imaging device, capturing a first image of an object; sending the captured image to a remote server; receiving, from the remote server a plurality of assets for the object; computing a current POV, the current POV representing a point of view from which the current image is taken with respect to the object; selecting, from the plurality of assets, a subset of assets associated with the current POV; displaying one or more assets pertaining to the subset of assets on a display device.

In a further aspect, there is provided a method for managing a display of assets associated with images captured in an augmented reality mode, the method comprising: receiving a first image of an object, from a computing device; identifying the object, and a plurality of assets associated with the object; computing a first POV for the first image, the first POV representing a point of view from which the current image is taken with respect to the object; selecting, from the plurality of assets, a first subset of assets associated with the first POV; sending the first subset of assets to the computing device for display over the first image.

Yet in a further aspect, there is provided a method for managing a display of assets associated with images captured in an augmented reality mode, the method comprising: receiving a first image of an object, from a computing device; identifying the object, and a plurality of assets associated with the object; sending the plurality of assets to the computing device; detecting a first POV for the first image, the first POV representing a point of view from which the current image is taken with respect to the object; sending, to the computing device, identification information identifying a first subset of assets associated with the first POV, for displaying one or more assets of the first subset on a display device associated with the computing device.

Figure 3A:
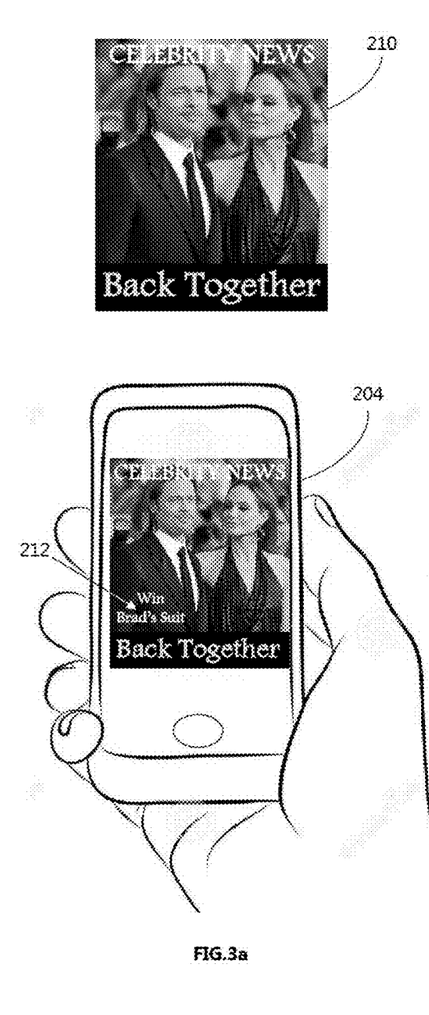
FIG. 3a illustrates an asset in a specific location with respect to object e.g. lower right of actor's jacket.

The following terms are defined below, and the embodiment described the usage of the apparatus over an object made of a page of a document as exemplified on FIG. 3a.

The term point of view POV is alternatively used as the angle of view and means the position from which the portable device is capturing the object in AR mode. The angle of view is defined by the angle between the camera of the portable device and the orthogonal axis of the document. The POV may include a sector of visibility defined by a first angle and a second angle, and having associated with it a plurality of images captured at angles of view ranging between the first angle and the second angle. These images are distorted versions of each other and trigger the display of the same assets on the portable device.

The term CTM stands for camera transformation matrix. The CTM describes the geometrical transformation needed from the view analyzed by the tracking system to the 2D plane made of the display of the apparatus. This matrix is typically computed by analyzing the position of a certain amount of specific points recognized in the view, and associate them with existing points in the reference image. Such set of points use preferably more than 3 reference points, which allow to reverse-compute the matrix needed to project these points on the 2D plane made by the viewport of the smartphone. A first fundamental absolute CTM is supplied by the AR service at time of recognition and is made part of the information sent back to the device once a marker is recognized. This CTM is permanently and regularly recomputed on as many frames as the computing power allows, so that when the object is recognized, the tracking mechanism supplied by the AR service gives additional local info allowing re-computation of this CTM matrix which allows deformation of Assets according to the projection, which finally allow to make the Asset looking like being part of the real scene viewed through the Camera.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present document describes a system and method for managing the display of assets associated with images captured during an AR experience to avoid congesting the display device of the portable device used for the AR experience. The method comprises capturing images of an object; receiving a plurality of assets associated with the object being captured from a remote server; detecting the POV from which the images were taken; selecting, from the plurality of assets, a first subset of assets associated with the POV; and displaying on the display device one or more assets pertaining to the first subset only. When the user changes the position from which the object is being captured, the device detects a second POV for the images captured and displays a second subset of assets different than the first subset. Whereby, existing assets disappear and new assets appear as the user changes positions or moves the device over the object being captured.

Figure 2:
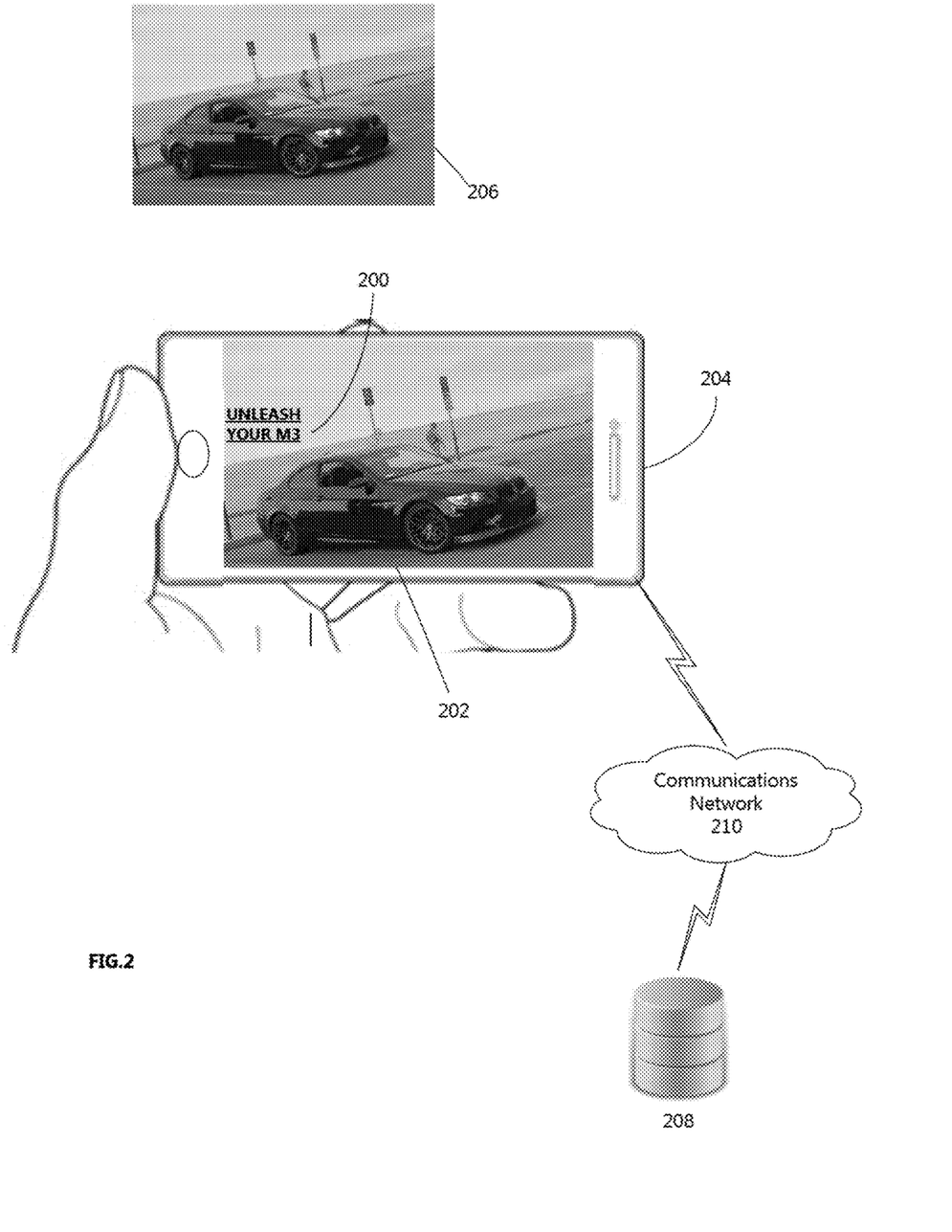
FIG. 2 illustrates an example of a system architecture for providing AR interactions; in accordance with an embodiment.

Typically, the assets are retrieved from a central server in response to a positive detection of an image taken or constructed from the video feed capturing the object 206. The application, running on the portable device, first sends to the server the page that will support the interaction. The format of the page can be an image or a PDL (page description language) like PDF or even a video. In which case, when a match occurs, a set of assets associated with the object is gathered and sent to the portable device for display/storage (or not). FIG. 2 illustrates an example of a system architecture for providing AR interactions, in accordance with an embodiment. For example, as shown in FIG. 2, the portable device 204 may send an image of the object 206 to a remote server 208 for verification (e.g. using a communications network 210). The server 208 may perform a search to find whether or the object 206 matches a pre-recorded image for which assets are available. If a match occurs the Server may send one or more of the assets to the portable device 204 for storage and/or display.

Figure 3B:
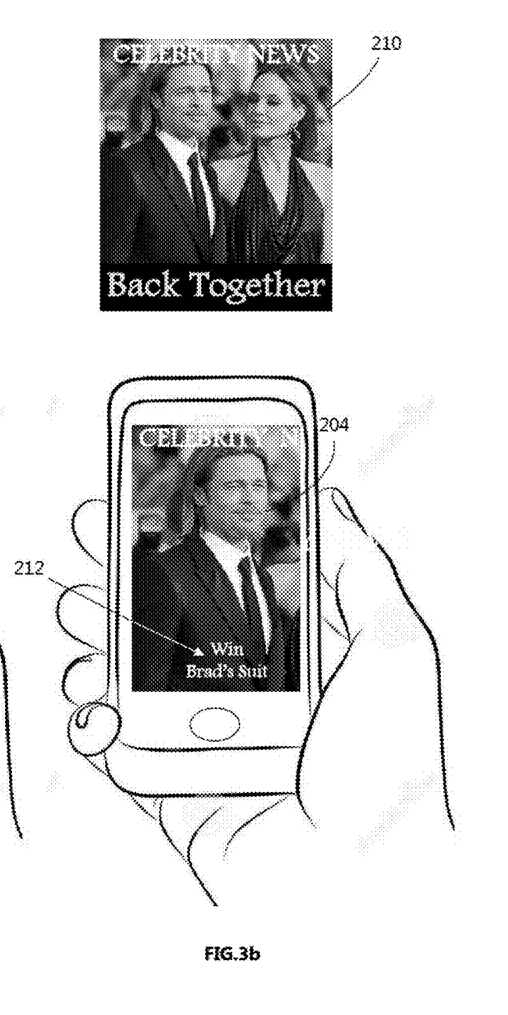
FIG. 3b illustrates how the asset of FIG. 3a moved to remain at the same position with respect to the jacket when the portable device's location has changed.

A tracking mechanism may be used to display the assets at predetermined positions with respect to the object which make them look like they are moving on the display as the portable device moves but in a manner that makes them look like they are attached to the object. This process allows the user to move the camera at will over an object or a document and still have the Assets displayed in place. As exemplified in FIGS. 3*a* and 3*b*, the portable device 204 is running in AR mode over a magazine 210. FIG. 3*a* illustrates an asset 212 in a specific location with respect to object 210 e.g. lower right of actor's jacket, and FIG. 3*b* illustrates how the asset 212 moved to remain at the same position with respect to the jacket when the portable device's location has changed.

Some existing solutions like Qualcomm Vuforia, HP Aurasma, Carnegie Mellon Argon, Caatchoum or Wikitude amongst other supplier of AR services, they allow to deliver a continuously updated tracking information once the basic image is found (Updating the projective CTM). These tracking mechanisms are based on some anchor points found in the original image and recognized and tracked in the video stream. These anchor points allow to deliver to the overlaying section of the display a transformation matrix that reflects the perspectival transformation of the displayed image. By using this information any asset can be transformed with a geometrical transformation that allows to continuously simulate aspects of a document where the assets appear as is the assets are parts of the document. The perspective analysis of the video allows to reconstruct a 3D matrix with coefficients that are linked. This is a method allowing fancy 3D drawing with perspective control where assets of a 3D nature are displayed and rendered like if they are real objects atop the background (the real object being captured). However when dealing with non 3d assets, the icons or images are stuck in place. The transformation being limited to trapezoidal transformation that simulate presence of the assets on top of the background.

Figure 4:
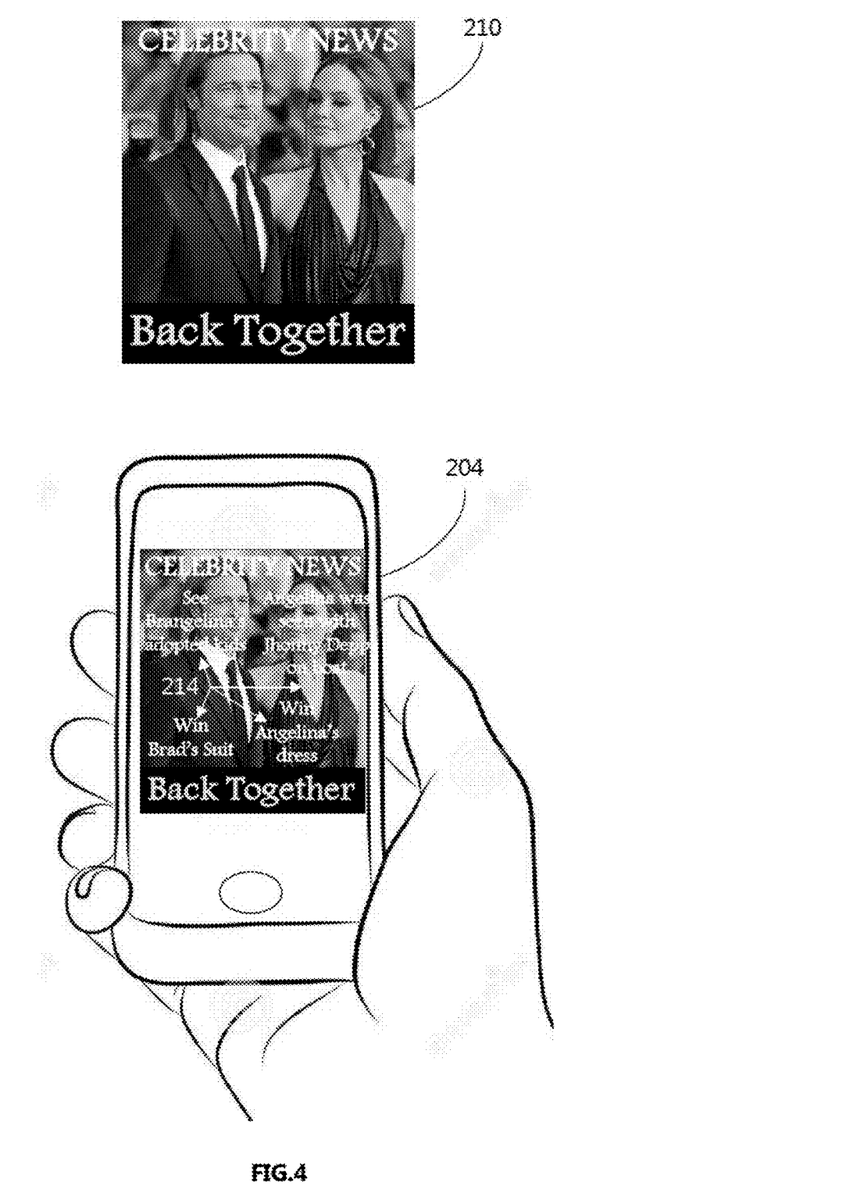
FIG. 4 which describes an example of a portable device capturing an object in AR and displaying a plurality of assets atop the object on the display.

However, as the number of assets associated with a given object increase, so does the problem associated with displaying them all on the same screen during virtually the same identification and tracking session, as exemplified in FIG. 4 which describes an example of a portable device capturing an object 210 in AR and displaying a plurality of assets 214 atop the object on the display 202. As shown in FIG. 4, the multiplicity of the assets renders the visibility of the main object 210 very limited and congested.

Embodiments of the invention manage the display of assets on the portable device so that only a portion of the available assets is displayed at a given time to avoid congesting the visibility of the object being captured. The portion may include one or more assets depending on the space that each assets needs to occupy, and the display area associated with the portable device whereby larger displays e.g. tablets can display more assets at a given time than smaller handheld smartphones e.g. iPAD® devices.

In an embodiment, the device may be configured to display specific assets based on the point of view POV ("Point Of View" aka angle of view) which represents the position of the portable device over the object, whereby an initial set of assets (including one or more assets) is displayed based on a current POV, which assets may disappear to be replaced by other assets as the POV changes (as the user moves the device over the object). Whereby, each set of assets may be associated with a given POV, and when a given POV is detected the assets associated with that POV will be displayed atop the document. Needless to say, the document needs to be pre-registered at the server (as an image or a digest of an image) and assets need to exist for the document. The POV may be determined using an image processing algorithm to determine elevation, angle and the like and may also be determined using an accelerometer associated with the device.

In an embodiment, the page sent by the portable device to the server for verification may be processed and converted to an image or a set of images. These images will be used as the reference image to be recognized by the AR part at the server. The aspects of the images must be as close possible to the image pickup by the camera during the recognition phase. In order to maximize the chance of recognition these images should go through a set of transformation that will first apply a color and luminance transformation to simulate the lighting condition if the flash light of the portable device is set on. This generates a faded image in the center of the page where luminance is so high that contrast decreases.

In an embodiment, the features' descriptors should allow for some geometrical distortion between the original marker and the view that the end user takes, in order to increase the recognition quality. A trapezoidal transformation simulating a 10 degree of axis of camera may then be applied to deal with the natural tendencies of the user holding the portable device bent towards them while hovering over the target media. Another image warping algorithm may be applied to generate images as they will look from sideways views. These additional views will help recognition by offering reference images that are closer to the image as they will be picked up if user's first axis of pickup is sideways. The recognition process may then use the central image and recognize it even if the pickup axis is not normal, whereby distorted images of the central image will be recognized and will have different assets associated with them.

The assets are associated with these images (the central image and its distorted versions representing different angles of view). Whereby, each image representing a different angle of view of the same object (otherwise said each image representing a different distorted image of the central image of the object) is associated with a subset of one or more assets, each asset covering a specific position over the image. The assets associated with each image disappear as another image representing a different angle of view is captured and new assets associated with the new image representing the new angle of view appear. These coordinates are transformed for each distorted image to reflect the change of image used for first detection. The displacement over the distorted image reflects at least partially the effect of the same asset but on the normal image with an angle to normal. These set of images with their associated set of sector for each assets are then the information used during user AR experience.

When the user activates the recognition service on their portable device, the identification system will identify one of the images, depending upon the axis at recognition time. In an embodiment, the user can then move over the image to allow the portable device to compute the angle between the normal and the current axis of camera to normal. This information is computed on the portable device to assert which assets have a view sector (aka angle of view or POV) matching the current position to activate their display and/or deactivate another one.

As the case maybe, if the constraint on the real time image tracking is under high stress then the device may reactivate the recognition service to determine if another image would better suit the angle in use. The stress condition of the tracker is determined by a combination of intrinsic information like the coefficients of the CTM that will show a lowering determinant revealing a lower precision of the matrix and an evaluation of the amount of assets surface that displays off screen and non-extrinsic information like the jitter between pattern analysis as this jitter is inversely proportional to the amount of features that the pattern tracking can reliably use.

The AR experience does not always need to re-recognize a target. This is more of a safety mechanism allowing the editor of the assets to assign the display of assets to very extreme angles of view and for angles of view having slight differences between them.

The main embodiment may also have another dimension added to the navigation paradigm by using information made of the projected size of the target media (the Asset). Most AR vendors deliver a SDK that manages the display of Assets, including application of the CTM to the tracked background to transform the Asset according to the required perspective rules. These SDK are not tailored for the purpose of the present embodiments and do not offer direct access to their internal mechanism including the CTM used during the tracking phase of the AR experience. In these cases, the access in real time to the CTM used for transforming the view is not always possible, but a hook can be installed that will track the aspect of the rendered Asset. This allows to analyze the transformation that occurred on the Asset, so that under a certain displayed size, either a CTM can be estimated from the transformation that the SDK did use on the Asset, or at worst the comportment of the Asset can be looked for and when extremely distorted, beyond a point where display allow relevant usage then they can be hidden. On the other hand, another Asset may exhibit exactly the inverse behavior and come out of a very distorted mode to a more relevant way of becoming displayed and will thus be displayed.

It must be noted that, in some embodiments, assets are display marks set by the apparatus and not supplied by the AR services. Therefore, the size and display aspects of such display marks are nearly completely known by the apparatus when displayed in a plain 0,0,0 degree condition. Accordingly, even a screen shot automate in the apparatus can be considered as a sufficient hook that allows to track the view and estimate the "compression" aspect that are the result of the perspective transformation of the "opaque" AR services SDK. Accordingly, even a pixel oriented analysis can allow to get a very coarse CTM but sufficient for the purpose mentioned herein. The solid angle made by the side of the media or more simply by the angular distance between a certain number of known features recognized allows to determine the apparent distance to the media.

The initial distance may be asserted as the one of first recognition. Each user has a certain natural instinct to stay still at a distance to media that they feel appropriate. This determines the origin for the z axis. Then when the user move back and forth towards the media the z information is added to the overall information and allows to select another set of assets. This can be exemplified by case where this move away from the media allows to see back in time for previous versions of the assets. Additionally the speed of the back and forth movement can be determined by a derivative of the position and the high speed movement can be discarded while fully respecting the low speed movement. This approach allows the user to artificially change the reference point which in turn allows the user to see the distance as a stride of a very long length. Additionally the second derivative can be determined which can be used as an acceleration to change the amount traveled for each low speed movement.

Figure 5:
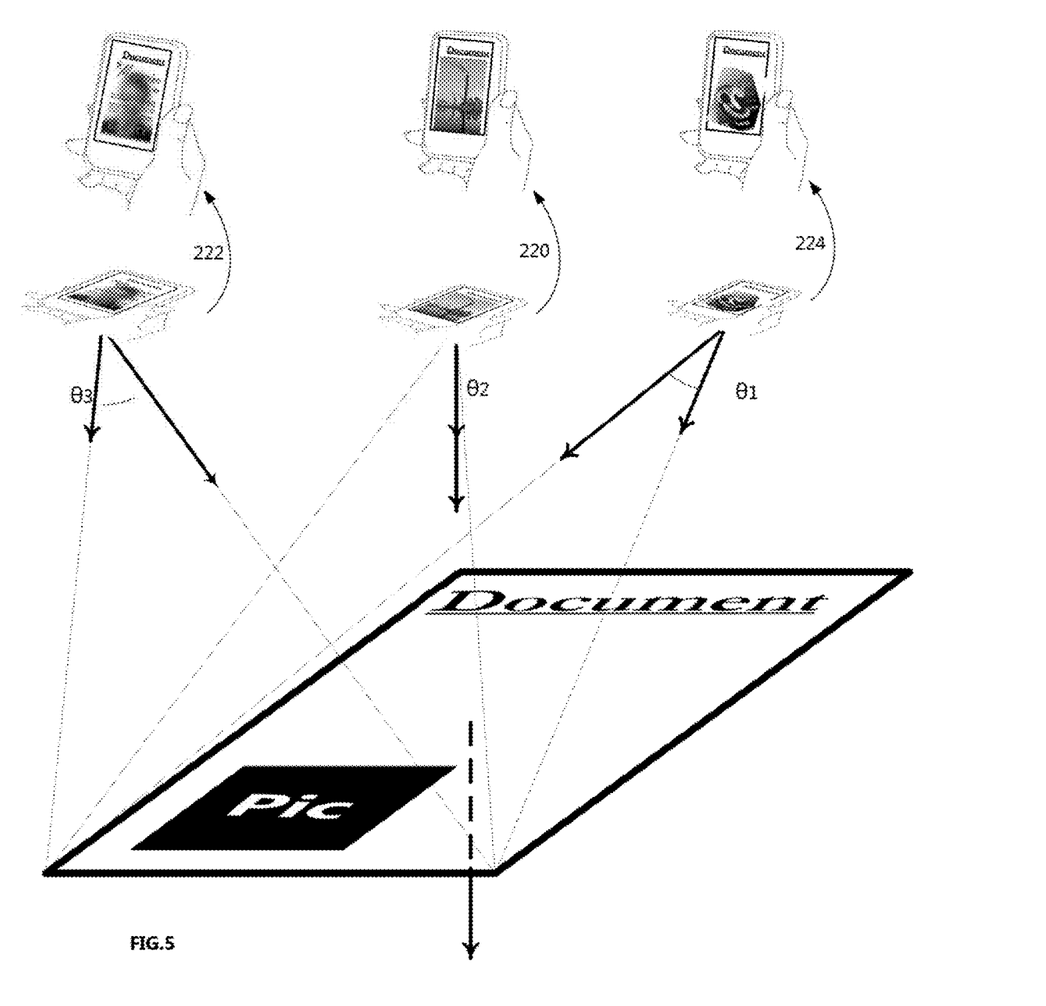
FIG. 5 illustrates a non-limiting example of implementation of an embodiment where the assets change by moving the portable device over the object being captured to the left, right and center.

FIG. 5 illustrates a non-limiting example of implementation of an embodiment where the assets change by moving the portable device over the object being captured to the left, right and center. With reference to FIG. 5, consider a non-limiting exemplary scenario where a document, e.g. a page containing a picture of a scientific apparatus in a magazine, is being captured by a user in AR mode. The document and assets relating to the document have been registered at the server. When the user captures the document in AR mode over the document assets representing pictures of implementation of the scientific apparatus may be displayed as shown at 220. When the user moves the device to the left another asset may be displayed representing another picture depicting its economical use as shown at 222, and when the user moves the device to the right another asset is displayed representing a picture depicting the danger/hazard that the apparatus represents as shown at 224.

In the example of FIG. 5, the POV is determined using the angles $\theta1$, $\theta2$, and $\theta3$ that the device makes with specific areas in the document being captured e.g. lower edges of the document. However, other locations may be chosen on the document without departing from the scope of the invention as defined in the claims.

Figure 6:
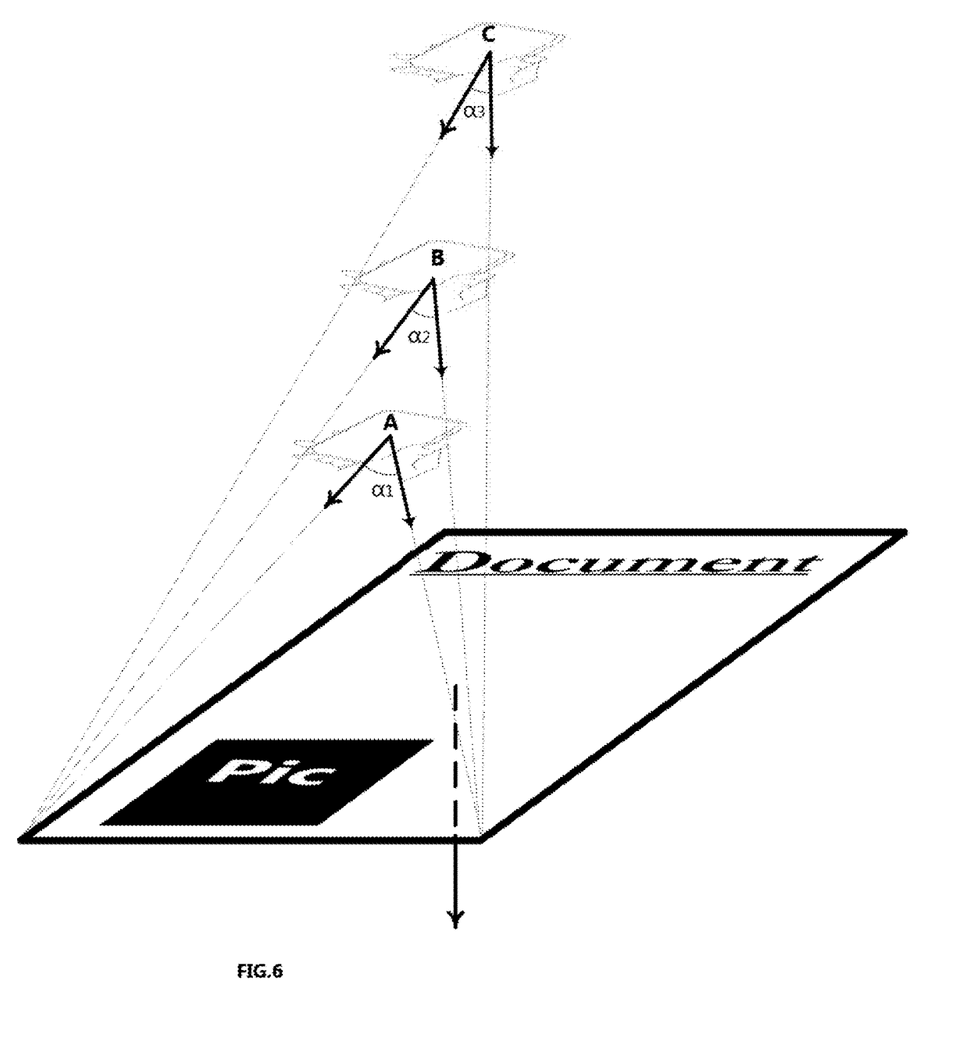
FIG. 6 illustrates different sets of assets A, B, and C displayed at different POVs associated with the angles $\alpha 1$, $\alpha 2$, and $\alpha 3$, respectively.
Figure 7A:
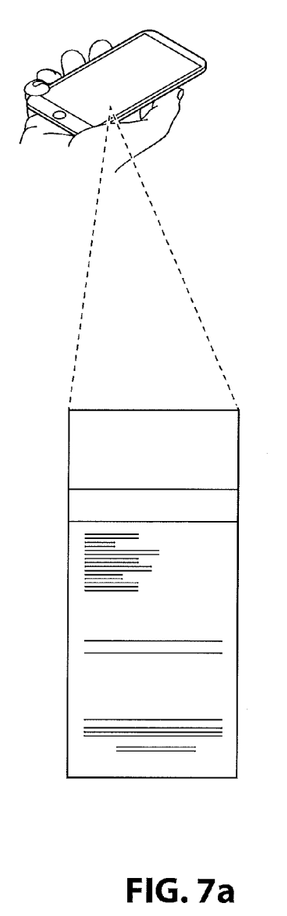
FIGS. 7a-7d illustrates an embodiment where different assets are displayed in response to detecting differently distorted images of the same object.
Figure 7B:
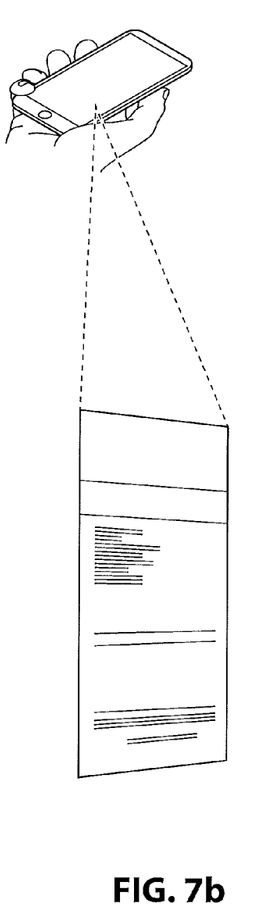
Figure 7C:
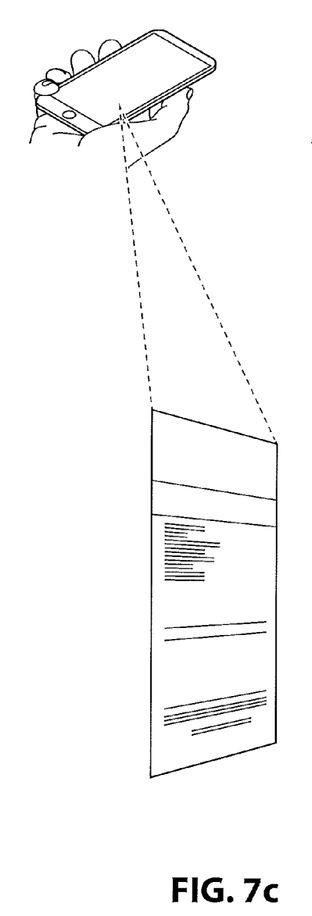
Figure 7D:
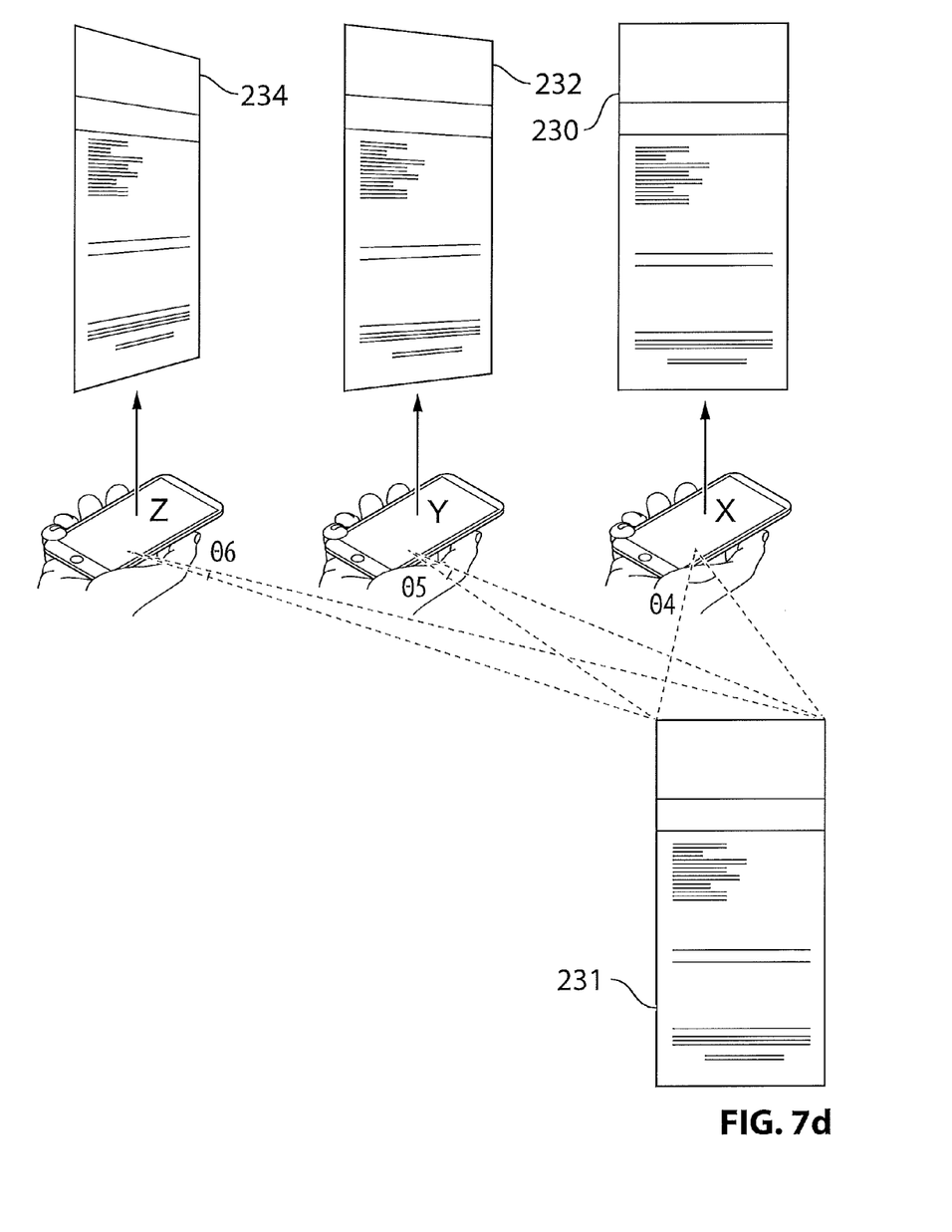

It should be noted that other types of movements can also be used such as up (away from the document), down (closer to the document), left, right, forward (away from the user), backward (toward the user). For example, FIG. 6 illustrates different sets of assets A, B, and C displayed at different POVs associated with the angles $\alpha1$, $\alpha2$, and $\alpha3$, respectively. For example, the set of assets A may be displayed at the position dictated by the angle $\alpha1$. The user may move the device upward to define an angle α2, at which point, the set of assets A disappears and will be replaced by the set of assets B. Likewise for the set of assets C and angle α3. The embodiments may also be implemented to have more than one set of assets per direction of movement. For example, moving from the central image to the left a first set of assets may be displayed at a first angle of view and a second set of assets may be displayed as the device moves further to the left. These implementations depend largely on the ability to detect different angles as exemplified in FIG. 6 and/or differentiate between different distorted images as exemplified in FIGS. 7a-7d. FIG. 7d illustrates an embodiment where a first set of assets X is displayed over a central image 230 of a document 231 whereby the portable device makes an angle θ4 with the top edges of the document 231. A second set of assets Y is displayed over a distorted image 232 taken at angle θ5 after moving the device to the left with respect to the central image. A third set of assets Z is also displayed over a distorted image 234 taken at an angle θ6 after moving the device further to the left with respect to distorted image 232.

In an embodiment, the app may allow the user to customize the app to select the assets that they want to see with each angle of view. For example, the assets may be classified in different categories (the classification may be permanent and may be done from meta-information), and the user can chose to associate a certain category with a certain angle of view. In a non-limiting example of implementation, assume the user is capturing a certain article disclosing a subject of a political nature. The user may customize or configure the app to view the political views of the left wing by moving the device to the left, and those of the right wing by moving the article to the right, and the economic interests to the country in the central image. Accordingly, the embodiments offer the user the ability to associate a give angle of view with a given classification, opinion or category of assets.

Accordingly, the angle between the camera of the portable device and the orthogonal axis of the document is the control lever for the user to control the assets being displayed. This angle is deduced from the perspective transformation matrix CTM made available from the AR solution once original image anchor points are detected. Once the tracking mechanism embarks it regularly delivers updates of this CTM, which allows to continuously compute the angle between the document and the portable device. Each Asset can be assigned a sector of visibility where the asset appears and when the perspectival angle of view is not within this sector, the asset will disappear. The transition can be sudden or smooth. A transparency zone can be defined that allows a transition with full asset melt of an image with a previous one.

The analysis of first derivative of angle to time allows to determine the speed of user while moving the Camera. This information can be used to create a decay effect allowing anticipation of display transition. In other words, the user can vary the speed of movement over the document to review various versions of the document over the span of a given period. Such period may be set to be proportional to the speed. In a non-limiting example of implementation, the user can over 10 cm of vertical movement, cross 10 years of edition (to view a 10 year old version of the document at a first speed, and also cross 1 year of edition using the same 10 cm of vertical displacement when the speed of movement is performed at a second speed lower than the first speed. Of course, the system can be configured to associate as many editions with as many different speeds in accordance with how practical and how fast the user can adapt to such speeds.

In another embodiment, the movement of Assets on the display can be configured to not follow the perspectival transformation, and to even stay still. The CTM updating process with however continue to allow to take decision to display the assets or not, as discussed with respect to FIG. 6 whereby different assets were displayed at different positions with respect to the document. The impact of the CTM on Asset presentation can then be organized so that the asset can appear or disappear in full depending upon the trigonometrical coefficient of the CTM. In terms of user experience applied to the above example it is like if the second asset appears first because user has put the camera atop the document, then when user moves the camera left or right of the document it makes respectively asset one or asset three to replace the previous asset displayed. The asset can then occlude a major part or even all of the display. The asset can continue being distorted according to CTM in order to reflect the movement of user within their display range, however in a "still" mode the asset may appear still and use a best display orientation but will still appear or disappear as the user moves the camera over the document. This allow more readable asset hut is slightly less intuitive. Otherwise said, the CTM allows to track the user intent and decide to hide or display the asset selectively. It can intuitively be said that when an asset suffers such transformation it becomes too narrow then it disappears leaving way for appearance of another one. This concept of narrow being of a mathematical nature so that display may not reflect this.

Two embodiments exist using this principle, the secondary embodiment used the goniometric gravitational or accelerometric information available from the portable device to determine the angle of the portable device to the document, However this approach alone suffers a major flaw as it forces the user to twist the camera hence aiming at specific place of the document that may not, of interest in many cases.

Another embodiment uses a non-sensor based approach by measuring the angle between the portable device camera and the orthogonal of the document. This measurement is done from image analysis of the deformation the document have depending upon the angle used to aim at it. The short focal distance available from the camera allow to increase the trapezoidal transformation that happens when moving the camera. In reality and to help intuit the principle, if the camera is held on left, the right side of the document will look smaller than right side. Similarly, if the camera is held on the right, the left side of the document will look smaller. The principle extends on the Z axis (from document to camera) as the closer to the camera the bigger the document will look, the farther form the document the smaller it will look.

The portable device finds the angle between the vertical axis projecting from the portable device onto the horizontal plane defined by the document and the camera axis by inverse matrices transformation of the perspective transformation matrix, the CTM.

The CTM is updated regularly by the tracking mechanism and this update applies to a first CTM computed when the document is first recognized. At this first moment, the CTM is computed using features known form the document and the discovered features found at recognition time. Various algorithms allow to find a best match and create such initial transformation matrix. The process of linking the update of the CTM to the Computer vision tracking system can be a tracking mechanism such as the pattern matching feature available for example in the OpenCV image processing library, using three or more patterns that are identified and registered at the time of the first appearance. Then on the next frame the search, and the success of detection of these patterns and the reporting of their positions allow to compute a CTM. The process of linking the update of the CTM to the Computer vision tracking system can also be replaced by a continuous computation using the features set used for recognition In any case a CTM is made available from the AR solution once original image anchors points (anchor points are descriptors selected by the system in view of their presence in both images and additional criteria such as uniqueness over other descriptors) are detected and the tracking mechanism embarks delivering updates for this CTM. Then as opposed to the traditional approach, the assets will not fully follow the perspectival transformation.

Figure 8:
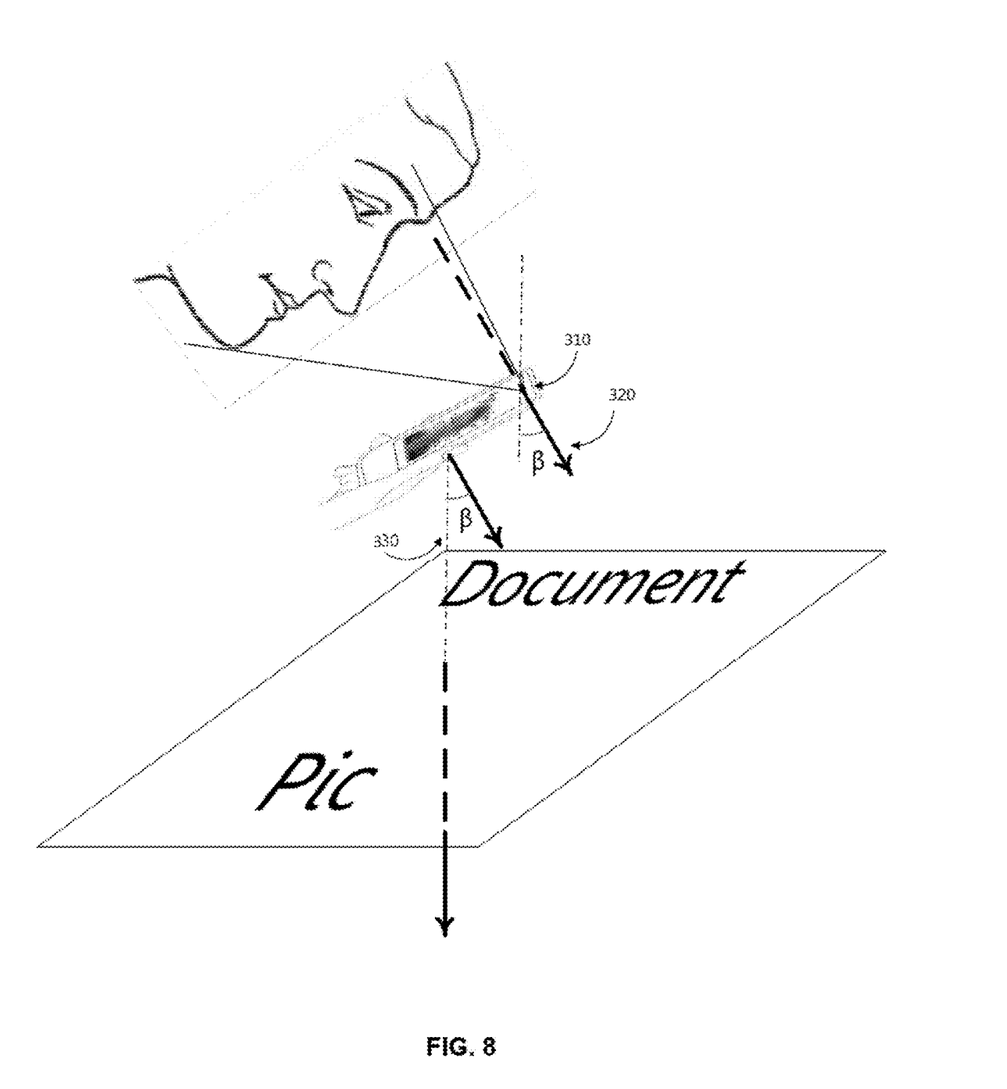
FIG. 8 illustrates an example of an enhanced embodiment wherein the tracking of display of assets is managed using a Front Facing camera of the portable device while the view display the object or a related scene once the object triggered recognition.
Figure 9:
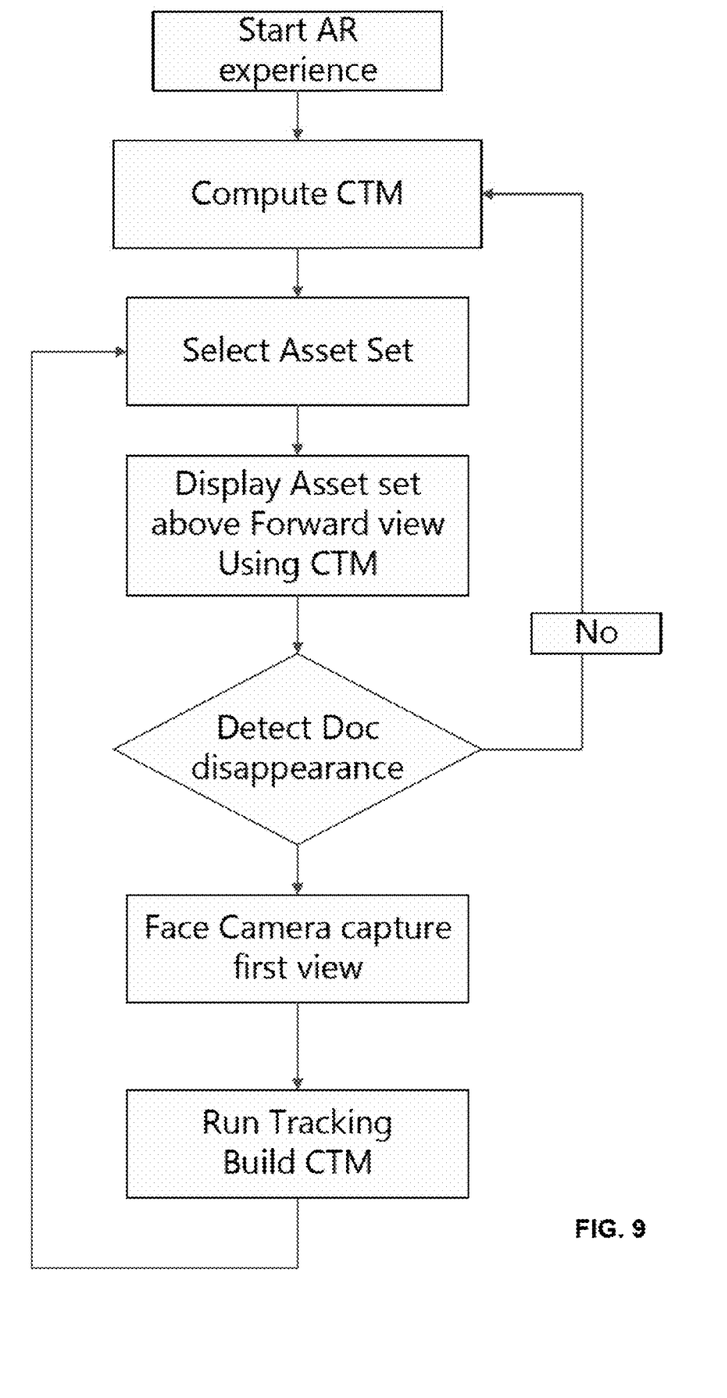
FIG. 9 is a flowchart of a method for managing the display of assets using a front facing camera, in accordance with an embodiment.

An enhanced embodiment may be implemented when the portable device is equipped with a Front Facing camera (310) that can embark while keeping display of the Forward looking camera, as exemplified in FIG. 8. FIG. 8 illustrates an example of an enhanced embodiment wherein the display of assets is managed using a Front Facing camera of the portable device; and FIG. 9 is a flowchart of a method for managing the display of assets using a front facing camera, in accordance with an embodiment.

In this embodiment, the navigational experience can continue even if the document disappears from the forward looking camera of the apparatus, whereby; the front facing camera may embark and a tracking mechanism performs a continued computing of the CTM as if the CTM (320) is computed form the Forward looking camera. This can extend the navigation experience keeping Assets displayed and played as the requirement for position suggests. In this mode the Front facing camera may feed a pattern analyzer and tracking like the Pattern tracking offered in the image processing library OpenCV. In this case the Front Facing camera is used and the image used for analysis is typically the user face or even a background thereof as captured when the forward camera tracking system disembarks. The resulting tracking information is used to compute a CTM (320) in a similar way as tracking with the forward camera which is initialized with value picked up from the Forward facing camera at the time when the document disappears (330). The disappearance event of the document that trigger this mode is typically but not imitatively a quick disappearance, for example within less that 100 ms. Alternatively the disappearance event can be slow but following a specific axis for example can be the sliding of the document in the vertical axis (which will not impact the experience if angular navigation is on the Horizontal axis and Zoom axis).

An exemplification of such use can be a Travel magazine which is open to a page with a Landscape, for case of example this landscape can be the real one facing the user while in a travel experience. This document is initially used like in FIG. 3a. The document may have three sets of Asset that work following the method explained above, with three sides; $1^{st}$ side includes a left view that displays assets related to trekking path, a second side which includes the center view related to historic landmark, and a third side which includes the right view dedicated to food location. Then, when the user removes the document facing the camera, the apparatus embarks Face camera while the Forward camera is still running and displays its pickup while merging its view of the scene with the proper Assets set. Whereby, the experience of moving sideways or back and forth continues, even if there is no picture for identification in front of the Forward Camera. The Asset set may then change as the user moves the smartphone in front of him.

The reason such method is of interest is to compensate for some impossible situations due to, for example, inherent difficulties to do image recognition and related AR experience over natural object because of a multiplicity of difficulties to capture a reference image of the object, for example when the access to the landscape cannot be done. Another situation is when the landscape may be seen from so many points of view that no reference image is perfectly suited for all these points of view. Another situation is when the user wants to see the Asset over a white wall. Additionally it can be understood that the Zoom navigation as depicted in FIG. 6, with angle $\alpha1$, $\alpha2$, and $\alpha3$, may give too many implementation issues when the object aimed at is very far, as the difference between $\alpha1$, $\alpha2$, and $\alpha3$, can be below precision of arithmetic. It is then of interest to find another reference point that allows an easier computation because variation of distance like an arm length generates major differences between angles. Then the interest of such mode is especially useful and allows the user to extend the Asset navigational experience apparently over real backgrounds. While these real background is not tracked the user will naturally be inclined to adjust his/her position to increase the realism of the experience.

FIG. 9 is a flowchart of a method for managing the display of assets using a front facing camera, in accordance with an embodiment.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for managing a display of assets associated with images captured in an augmented reality mode on a portable device, the method comprising:
    using a first imaging device, capturing a first image of an object;
    receiving a plurality of assets associated with the object;
    detecting a first POV associated with the first image, the first POV representing a point of view from which the first image is taken using the portable device, wherein the first POV comprises a sector of visibility defined by a first angle and a second angle, and having associated with it a plurality of first images captured at angles of view ranging between the first angle and the second angle;
    selecting, from the plurality of assets, a first subset of assets associated with the first POV; and
    displaying one or more assets pertaining to the first subset on a display device associated with the portable device.

2. The method of claim 1, further comprising displaying the one or more assets pertaining to the first subset over the first image.

3. The method of claim 1, further comprising running a tracking mechanism to keep the assets at given positions with respect to the object being shown on the display device as the portable device moves within the first POV.

4. The method of claim 1, further comprising:
    capturing a second image of the object;
    detecting a second POV associated with the second image, the second POV representing the point of view from which the second image is taken, the second POV being different from the first POV;
    selecting, from the plurality of assets, a second subset of assets associated with the second POV, the second subset being different from the first subset;
    displaying one or more assets pertaining to the second subset on the display device.

5. The method of claim 4, further comprising displaying the one or more assets pertaining to the second subset over the second image.

6. The method of claim 4, wherein capturing the first image and capturing the second image comprises running a video feed over the object and capturing the object from different positions resulting in different POVs to subsequently display different assets as the POV changes.

7. The method of claim 6, wherein capturing the object from different positions comprises moving the imaging device in one or more of the following directions: left, right, forward, backward, upward away from the object, and downward closer to the object.

8. The method of claim 7, where the second derivative of the movements are analyzed to allow a computation of offset that can be applied to the first FOV expanding the range of positions without requiring movement of the same range.

9. The method of claim 1, further comprising customizing the display of assets on the portable device including associating a classification to each asset, and associating each classification to a different POV at the portable device, whereby moving the portable device in a given POV results in displaying assets having classifications associated with that POV.

10. A computing device for implementing the method of claim 1.

11. A method for managing a display of assets associated with images captured in an augmented reality mode on a portable device, the method comprising:
using an imaging device, capturing a first image of an object;
sending the captured image to a remote server;
receiving, from the remote server a plurality of assets for the object;
computing a current POV, the current POV representing a point of view from which the current image is taken with respect to the object wherein the current POV comprises a sector of visibility defined by a first angle and a second angle, and having associated with it a plurality of first images captured at angles of view ranging between the first angle and the second angle;
selecting, from the plurality of assets, a subset of assets associated with the current POV;
displaying one or more assets pertaining to the subset of assets on a display device.

12. A computing device for implementing the method of claim 11.

13. A method for managing a display of assets associated with images captured in an augmented reality mode, the method comprising:
receiving a first image of an object, from a computing device;
identifying the object, and a plurality of assets associated with the object;
computing a first POV for the first image, the first POV representing a point of view from which the current image is taken with respect to the object, wherein the first POV comprises a sector of visibility defined by a first angle and a second angle, and having associated with it a plurality of first images captured at angles of view ranging between the first angle and the second angle;
selecting, from the plurality of assets, a first subset of assets associated with the first POV;
sending the first subset of assets to the computing device for display over the first image.

14. The method of claim 13, further comprising:
receiving a second image of the object;
detecting a second POV associated with the second image, the second POV representing the point of view from which the second image is taken, the second POV being different from the first POV;
selecting, from the plurality of assets, a second subset of assets associated with the second POV, the second subset being different from the first subset;
sending the second subset of assets to the computing device for display over the second image.

15. A computing device for implementing the method of claim 14.

16. The method of claim 13, further comprising customizing the display of assets on the computing device including associating a classification to each asset, and associating each classification to a different POV at the portable device, wherein moving the portable device in a given POV results in displaying assets having classifications associated with that POV.

17. The method of claim 13, further comprising running a tracking mechanism to keep the assets at given positions with respect to the object being shown on the display device as the portable device moves within the first POV.

18. The method of claim 13, further comprising associating a classification to each asset, and associating each classification to a different POV.

19. A method for managing a display of assets associated with images captured in an augmented reality mode, the method comprising:
receiving a first image of an object, from a computing device;
identifying the object, and a plurality of assets associated with the object;
sending the plurality of assets to the computing device;
detecting a first POV for the first image, the first POV representing a point of view from which the current image is taken with respect to the object wherein the first POV comprises a sector of visibility defined by a first angle and a second angle, and having associated with it a plurality of first images captured at angles of view ranging between the first angle and the second angle;
sending, to the computing device, identification information identifying a first subset of assets associated with the first POV, for displaying one or more assets of the first subset on a display device associated with the computing device.

20. The method of claim 19, further comprising:
receiving a second image of the object;
detecting a second POV associated with the second image, the second POV representing the point of view from which the second image is taken, the second POV being different from the first POV;
sending, to the computing device, identification information identifying a second subset of assets associated with the second POV, for displaying one or more assets of the second subset on the display device.

21. The method of claim 20, further comprising detecting a third POV using a front facing imaging device aimed at a different object; and displaying one or more assets pertaining to the third POV on a display device associated with the portable device.

22. The method of claim 21, wherein the different object is the face of the user.

23. A method for managing a display of assets associated with images captured in an augmented reality mode on a portable device, the method comprising:
- using a first imaging device, capturing a first image of an object;
- receiving a plurality of assets associated with the object;
- detecting a first POV associated with the first image, the first POV representing a point of view from which the first image is taken using the portable device;
- selecting, from the plurality of assets, a first subset of assets associated with the first POV;
- displaying one or more assets pertaining to the first subset on a display device associated with the portable device; and
- customizing the display of assets on the portable device including associating a classification to each asset, and associating each classification to a different POV at the portable device, wherein moving the portable device in a given POV results in displaying assets having classifications associated with that POV.

24. A computing device for implementing the method of claim 23.

* * * * *